Figure 1:
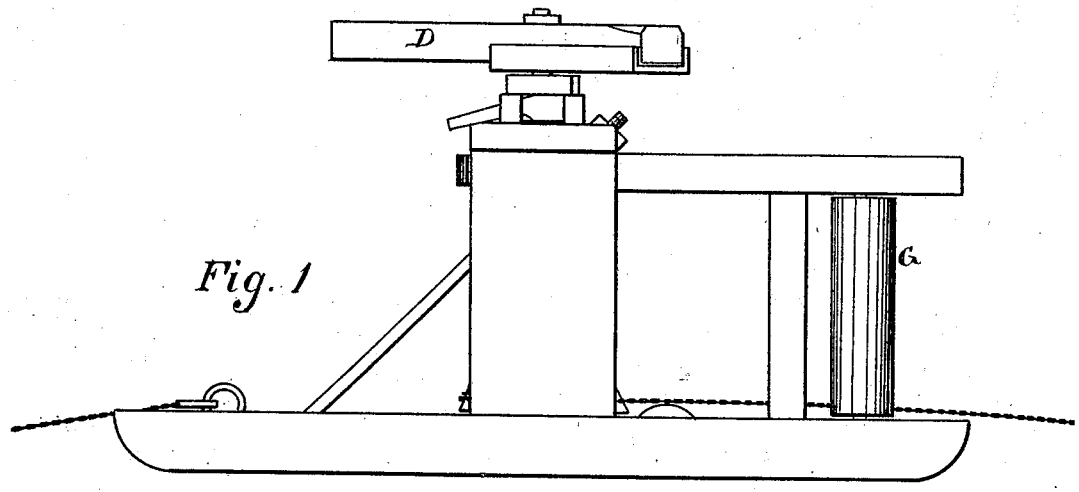
Figure 2:
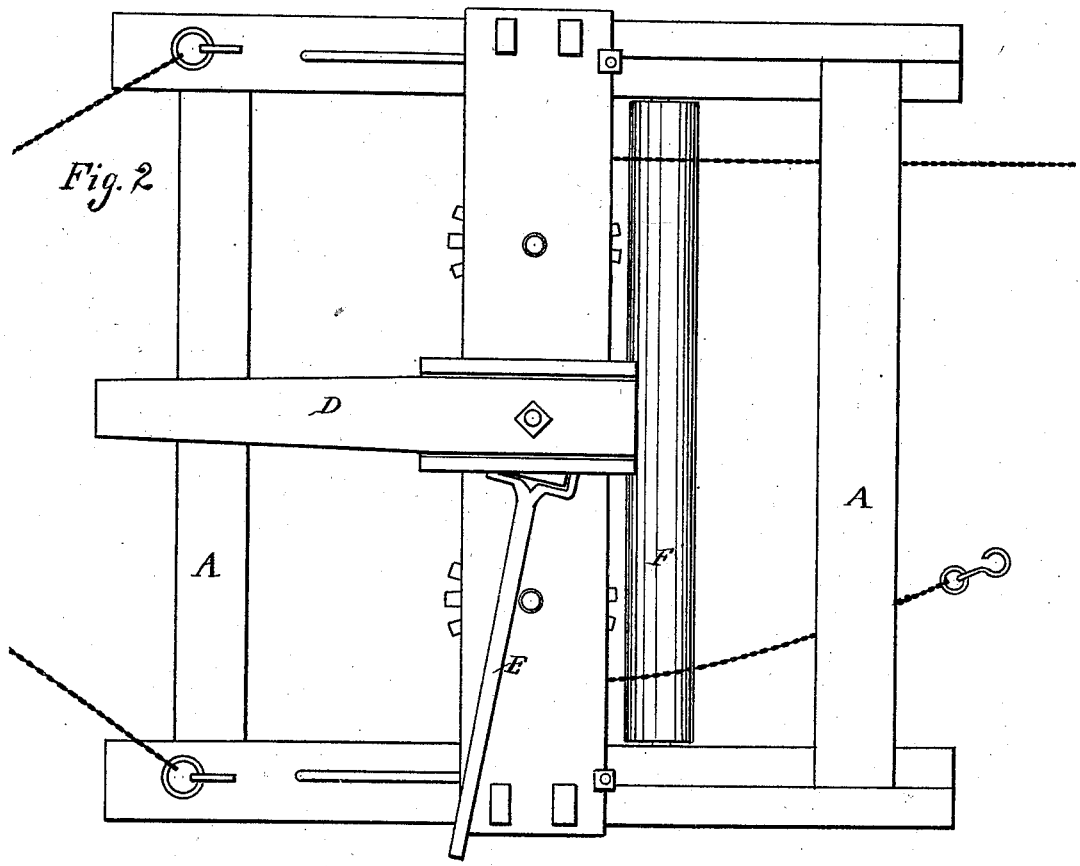

2 Sheets—Sheet 1.

R. W. BURK.
GRUBBING MACHINE AND CAPSTANS.

No. 176,926. Patented May 2, 1876.

WITNESSES
Thomas Bernard
C. L. Evert

INVENTOR
R. W. Burk
per Alexander Mason
ATTORNEYS.

2 Sheets—Sheet 2.
R. W. BURK.
GRUBBING MACHINE AND CAPSTANS.
No. 176,926. Patented May 2, 1876.
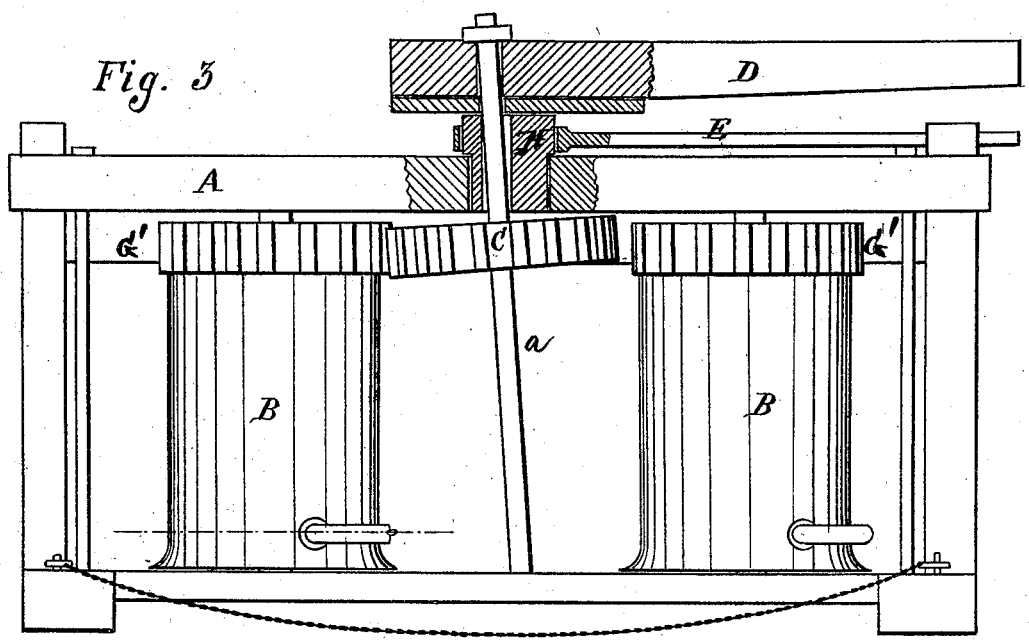
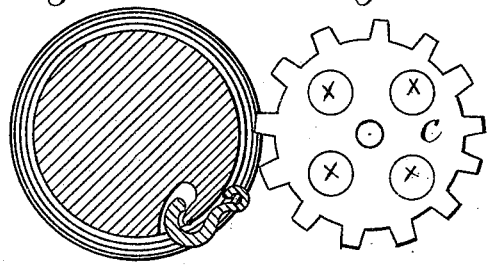
WITNESSES
Thomas Bernard,
C. L. Evert.
INVENTOR
R. W. Burk,
per Alexander Mason
ATTORNEYS.
N. PETERS, PHOTO-LITHOGRAPHER, WASHINGTON, D. C.

UNITED STATES PATENT OFFICE.

ROSWELL W. BURK, OF PENFIELD, ASSIGNOR OF ONE-HALF HIS RIGHT TO DAVID OWENS, OF BEDFORD, MICHIGAN.

IMPROVEMENT IN GRUBBING-MACHINES AND CAPSTANS.

Specification forming part of Letters Patent No. 176,926, dated May 2, 1876; application filed March 30, 1876.

*To all whom it may concern:*

Be it known that I, ROSWELL W. BURK, of the town of Penfield, in the county of Calhoun, and in the State of Michigan, have invented certain new and useful Improvements in Grubbing-Machines and Capstans; and do hereby declare that the following is a full, clear, and exact description thereof, reference being had to the accompanying drawings and to the letters of reference marked thereon, making a part of this specification.

This invention relates to capstans, and its especial object is to provide a simple and effectual machine for extracting stumps and for other agricultural purposes; and it consists in connecting to a suitable frame a double windlass or rope-drum, so arranged with reference to the horse or other power and each other that while one of the drums is being acted on, and the grub to which its chain is attached is being lifted from its bed, or the like, the other shall be out of gear, and its chain or rope free to be attached to another grub or load, thus affording means for doing a greater amount of work in a given time than is possible with a capstan having a single drum.

In carrying out my invention I provide a strong timber frame, A, provided with uprights and beams, substantially as shown in the drawings. Within this frame I arrange two drums, B B, on the top of which are secured suitable gear-wheels G' G'. Between these drums, and upon a vertical shaft, a, extending through the upper part of the frame, I arrange the driving-pinion C. On top of this shaft I secure the lever or sweep D, through the medium of which the drums are operated. The upper bearing of the driving-pinion shaft is an eccentric, H, by turning which with the lever E the driving-pinion is thrown into and out of gear with one or the other of the drum-pinions, as may be desired. Suitable stops are provided on the top of the frame for holding the lever E in position.

To obviate friction of the chains or ropes, and in order to cover the greatest amount of ground without moving the machine, I provide, in addition to the horizontal roller F, the vertical rollers G G.

The drum gear-wheels G' G' are perforated, as shown at *x*, to afford convenient and secure means of attachment to the drum. Suitable anchoring chains are attached to the frame.

Having thus fully described my invention, what I claim as new, and desire to obtain by Letters Patent, is—

In combination with the two drums, B B, having gear-wheels G' G' upon their upper ends, the upright shaft *a*, provided with driving-pinion C, the eccentric H, sweep D, and lever E, substantially as and for the purposes herein set forth.

In testimony that I claim the foregoing I have hereunto set my hand this 21st day of February, 1876.

ROSWELL W. BURK.

Witnesses:
DAVID O. WEST,
JOHN MEACHEM.